July 25, 1967 W. KOHLHAGEN 3,333,129
SELF-STARTING SYNCHRONOUS REACTION MOTOR
Filed Sept. 14, 1964 3 Sheets-Sheet 3
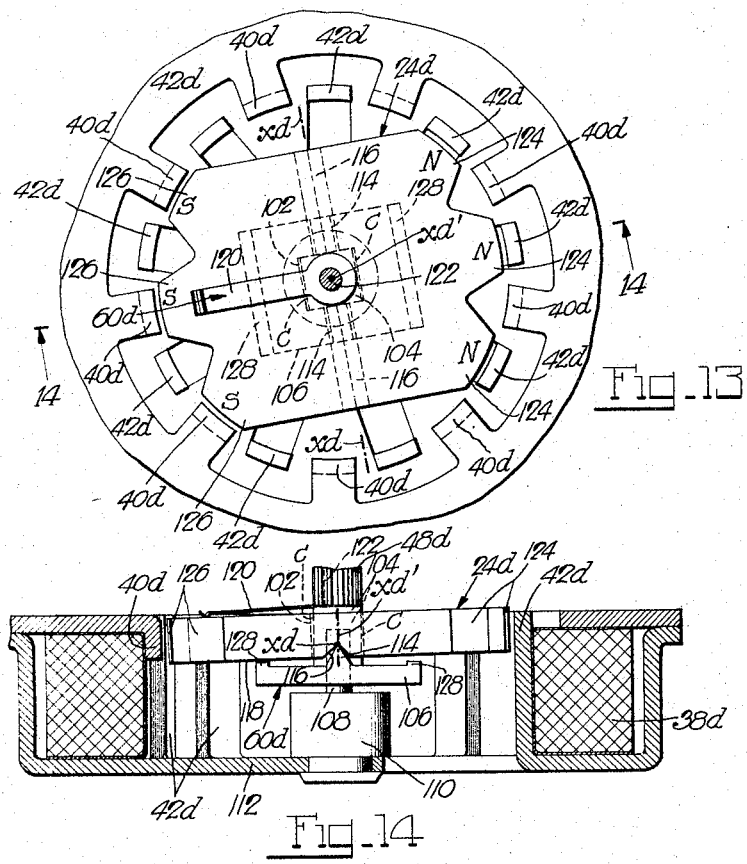
INVENTOR
Walter Kohlhagen
BY
Attorney United States Patent Office 3,333,129
Patented July 25, 1967

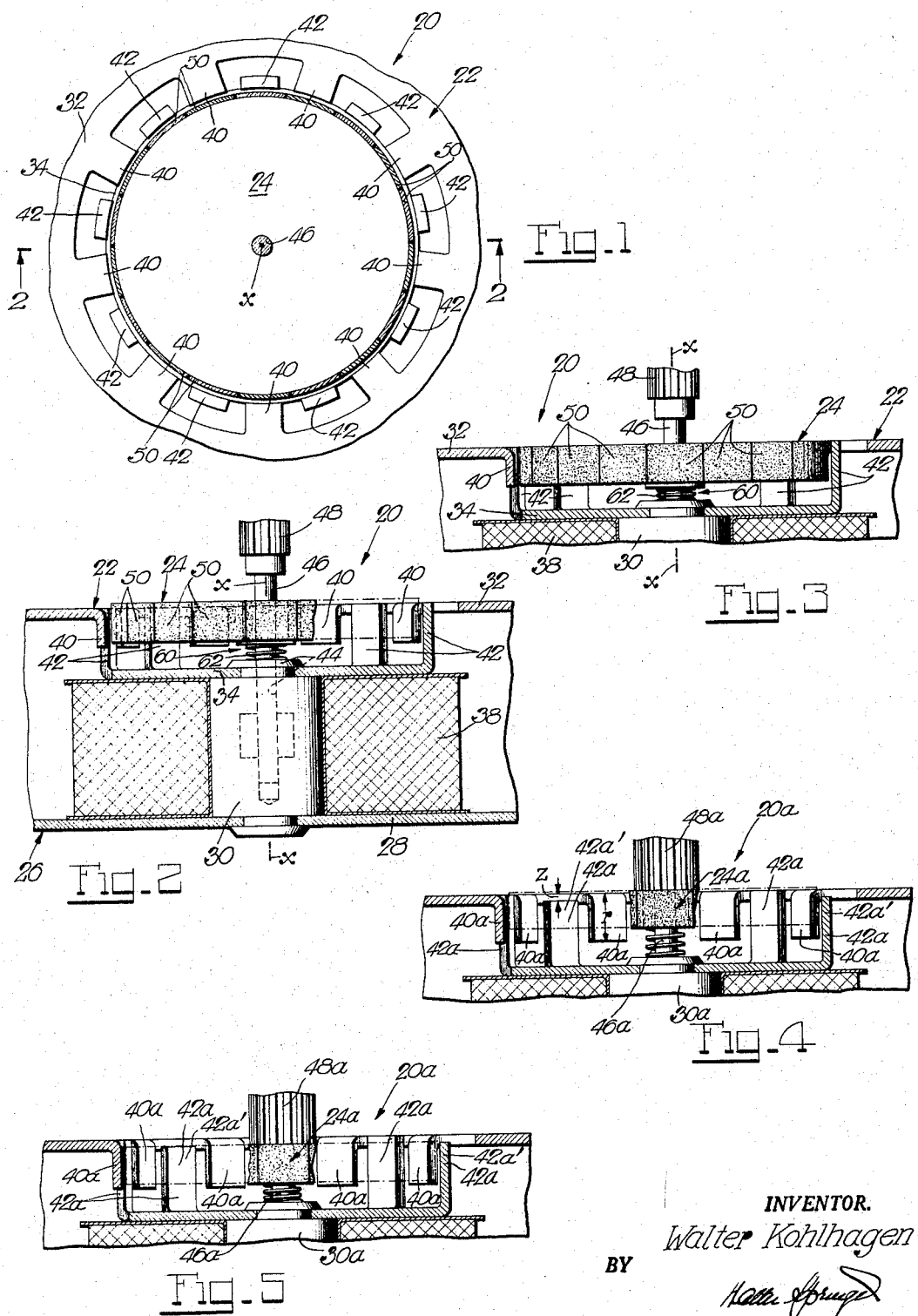

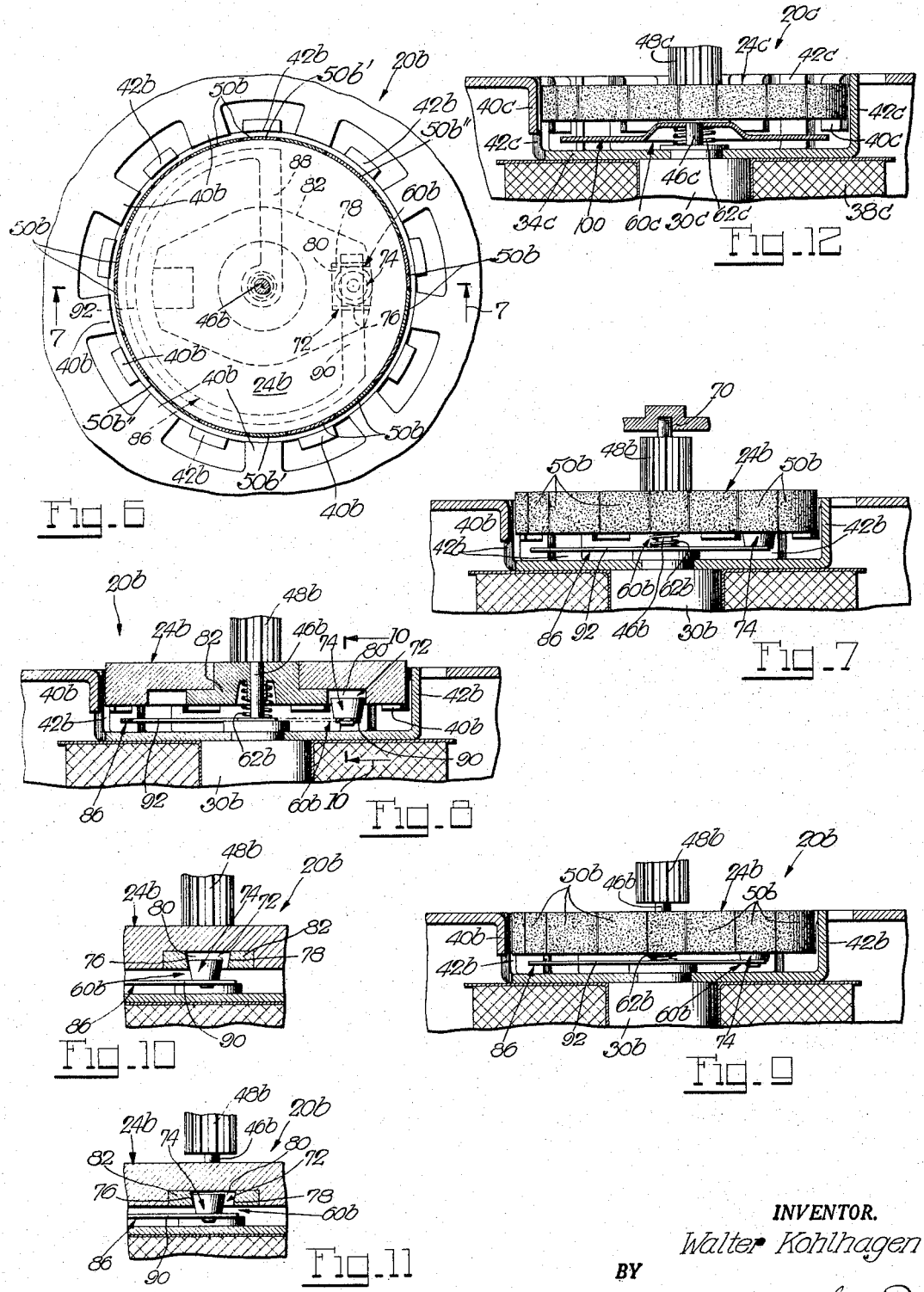

3,333,129
SELF-STARTING SYNCHRONOUS REACTION
MOTOR
Walter Kohlhagen, Elgin, Ill., assignor to Amphenol
Corporation, a corporation of Delaware
Filed Sept. 14, 1964, Ser. No. 396,204
18 Claims. (Cl. 310—164)

This invention relates to synchronous motors in general and to self-starting synchronous reaction motors in particular.

Motors of this type have a multi-polar field of which alternate poles are of opposite polarity at any instant and change their polarities in phase with an alternating current supplied to the associated field coil, and a permanent-magnet rotor the poles of which cooperate with the field poles in driving the rotor in synchronism with the alternation of the current. These motors are in principle self-starting by reaction between the rotor poles and associated field poles, with the rotor responding in characteristic vibration to initial polarity changes of the field poles until sufficiently unstable to take off in either direction in which it has a predominant urge to go. Since these motors are in most cases required to run in one certain direction, there is provided in the usual rotor to output-pinion drive thereof a directional drive control which functions to reverse this drive on a wrong-directional start of the rotor, and also acts as a stop against which the motor load, if spring-backed, will back-up on interruption of the motor drive, or against which the motor load, if not self-backing, may immediately be backed on the slightest attempt of the rotor at a start in the wrong direction. These impediments to a rotor start in either direction, be it the motor load or the load-backing drive control, frequently deprive the rotor of the necessary freedom to respond to initial polarity changes of the field poles, with the result that the rotor will remain hung-up in its idle position and thus fail to start. While starting failure of motors from this cause is frequent enough, there are also numerous other causes for such starting failure, such as particularly unfavorable rotor rest positions or low voltage of the applied current, for example.

In attempting to eliminate, or at least greatly reduce, starting failure of these motors, numerous expediencies have been resorted to which involve such principles as unbalanced rotor poles, limited free motion of the rotor relative to the motor load, and resiliency in the rotor drive, or combinations thereof. However, while these expediencies do succeed in reducing starting failures of these motors, they fall far short of virtually eliminating all starting failure and, hence, fail to cope with all possible causes of starting failure.

It is the primary aim and object of the present invention to have in a motor of this type a starting provision which acts in response to initial polarity changes of the field poles to force the motor irresistibly into a self-start under any and all conditions, including those under which prior motors do experience starting failure, thereby to achieve, to all practical intents and purposes, elimination of all starting failure.

It is a further object of the present invention to provide a motor of this type in which the responsive action of the aforementioned starting provision to initial polarity changes of the field poles is to set the rotor into vibration which is not only very lively but also so irresistible as to eliminate, with absolute certainty under any and all conditions, inertial hang-up of the rotor which is responsible for so many starting failures, thereby rendering the magnetic forces of the field and rotor poles, i.e., the polar magnetic forces particularly effective on the highly excited rotor in compelling it into a self-start.

Another object of the present invention is to provide a motor of this type in which the responsive action of the aforementioned starting provision to initial polarity changes of the field poles is to set the rotor into lively vibration preferably axially thereof, whereby the rotor's vibration in this wise is entirely unimpeded by any forces resisting a rotor start and, hence, is irresistible as aforementioned, to the end of having the highly excited rotor respond to the polar magnetic forces with irresistible starting urgency. Axial starting vibration of the rotor in this fashion even acts in concert with the polar magnetic forces in compelling the rotor into additional vibration about its axis if needed for its take-off against a heavy load or other start resistance, with the result that the polar magnetic forces will have on the highly excited rotor the powerful starting effect required for the purpose. Thus, this mode of starting a rotor is in its starting effect on the same of sudden or inching, powerful wedge-like, urgency which overpowers all normal, and even exceptionally high, load or other resistance to its start. This mode of rotor-starting is even suited for reliable starting of rotors with completely balanced poles which provide optimum running torque but which heretofore were unreliable starters because no starting forces were generated when the rotor and field poles were in alignment with each other. The starting torque of rotors of balanced or unbalanced poles may thus be also fairly close to their full running torque.

A further object of the present invention is to have in a motor of this type a starting provision the responsive action of which to initial polarity changes of the field poles is to set the rotor into axial vibration into and from full register with the associated field poles, thereby even further increasing the starting effort of the rotor, by virtue of even greater urgency of the latter into additional vibration about its axis if needed for its take-off, and increased wedge-like urgency to overpower any load or other resistance to its start in any event.

It is another object of the present invention to provide a motor of this type in which the starting provision just mentioned is of exceeding structural simplicity and insignificant cost, involving merely axial shiftability of the rotor and a single element, preferably a simple spring, which normally urges the rotor out of full register with the associated field poles, with the spring force and the polar magnetic forces coacting, on field reexcitation after a motor stop, to set the rotor into axial vibration into and from full register with the field poles. Further, the starting provision in this form is in its rotor-vibratory action of the utmost effectiveness and reliability for the longest time. Thus, the rotor will, on reexcitation of the field, be by the polar magnetic forces axially drawn into and repelled from full register with the field poles which tends to occur once for each cycle of the applied current, with the spring force then acting, on the one hand to yield to the rotor on its magnetic draws into full register with the field poles, and on the other hand to urge the rotor rebound-like from full register with the field poles sufficiently to permit the polar magnetic forces to exert themselves in effecting and controlling the repulsions of the rotor from full register with the field poles. Of course, once the rotor has started and runs in synchronism with the alternation of the applied current, the rotor will not vibrate, for the polar magnetic forces then have a predominant urgency to draw the rotor into, and will in fact keep the same in, full register with the field poles against the spring force, with each draw of the rotor occurring with each half-cycle of the current as the rotor poles are then predominantly in alignment with their opposite-polarity field poles. Accordingly, the spring must on the one hand be sufficiently weak to permit the polar magnetic forces to draw the rotor in its starting phase into, and keep the running rotor in, full register with the field poles, and on the other hand be sufficiently strong to keep the idle rotor out of full register with the field poles and even overcome its gravity if the motor is to be used in any position.

It is a further object of the present invention to provide a motor of this type in which the field pole arrangement is such that the rotor is, in its spring-compelled idle position, out of full register with, but nevertheless confined, or nearly confined, within the overall axial extent of, the field poles, thereby to achieve on field reexcitation immediate and optimum exertion of the polar magnetic forces in setting the rotor into axial vibration as well as urging it into rotary motion. This is achieved in exceedingly simple manner by arranging the field poles so that they extend lengthwise in the direction of the rotor axis with a number of the field poles being coextensive over a region axially of the rotor, while the remaining field poles are coextensive with the other field poles over only part of this region, whereby there is within this region an axial zone in which fewer than all field poles extend and in which the rotor extends in its idle position.

Another object of the present invention is to provide a motor of this type in which the action of the aforementioned starting provision to set the rotor into magnetically-impulsed axial vibration is augmented by simultaneous, small but irresistible, angular displacement of the rotor, to the end of achieving, at the most wedge-like jogging of the motor load, and at the least enforced lively excitement of the rotor, with the rotor responding in either case to the polar magnetic forces with an unfailing self-start. This is achieved in purely structural and exceedingly simple manner, by leaving the rotor free on its shaft for axial and rotary motion thereon, and coupling them for joint rotation by registering cam and follower elements thereon which on axial starting vibration of the rotor also cooperate wedge-like to force the rotor and its shaft into relative angular displacement. Further, it is preferable to provide for ready axial yieldability of one of the cam and follower elements in order to obviate start-defeating suppression of the axial starting vibration of the rotor under any circumstances, such as back-up of the motor load on the cam and follower elements, for example, with these elements being further preferably arranged to have on their cooperation a component force urging the rotor into, rather than from, full register with the associated field poles so as not to counteract the polar magnetic forces in keeping the rotor, when running, in full register with the field poles. Also, by providing for some slight freedom of rotary motion between the cam and follower elements to permit their angular rotor displacement action, the axially vibrating rotor, if not budging its shaft for any reason on cooperation between these elements, is free to respond to the polar magnetic forces in additional vibration about its axis and thereby become so highly excited as to take off without fail with even the heaviest load under the urgency of the polar magnetic forces.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary front view of a motor embodying the present invention;

FIG. 2 is a fragmentary section through the same motor as taken substantially on the line 2—2 of FIG. 1;

FIG. 3 is a fragmentary section similar to FIG. 2, showing the motor in a different operating condition;

FIG. 4 is a fragmentary section through a motor embodying the present invention in a modified manner;

FIG. 5 is another fragmentary section through the modified motor of FIG. 4, with the motor shown in a different operating condition;

FIG. 6 is a fragmentary front view of a motor embodying the present invention in another modified manner;

FIG. 7 is a fragmentary section through the modified motor of FIG. 6, with the section taken substantially on the line 7—7 of FIG. 6;

FIG. 8 is a section similar to FIG. 7, showing additional elements of the motor in section;

FIG. 9 is a fragmentary section similar to FIG. 7, showing the motor in a different operating condition;

FIG. 10 is a fragmentary section through certain prominent elements of the modified motor of FIG. 8, with the section taken on the line 10—10 of FIG. 8;

FIG. 11 is a fragmentary section similar to FIG. 10, showing the motor elements in a different operating condition;

FIG. 12 is a fragmentary section through a motor embodying the present invention in a further modified manner;

FIG. 13 is a fragmentary front view of a motor embodying the present invention in another modified manner; and FIG. 14 is a section through the modified motor of FIG. 13, with the section taken substantially on the line 14—14 of FIG. 13.

Referring to the drawings, and more particularly to FIGS. 1 to 3 thereof, the reference numeral 20 designates a synchronous motor having a field 22 and a rotor 24. The field 22 comprises, in this instance, a conventional field cup 26 to the bottom 28 of which is secured a center core 30 (FIG. 2), and outer and inner field parts or plates 32 and 34 which are suitably secured to the top of the field cup 26 and to the outer end of the center core 30, respectively. Received in the field cup 26 and surrounding the center core 30 is a field coil 38. The outer and inner field plates 32 and 34 are provided with sets of inner and outer field poles 40 and 42, respectively, which are arranged circularly about a rotor axis $x$ and of which successive poles of one set alternate with successive poles of the other set in conventional manner.

Provided in the center core 30 is a preferably lubricated bearing 44 for a shaft 46 which is turnable about the axis $x$ and on which the rotor 24 is firmly mounted. Also mounted on the shaft 46 is in this instance a pinion 48 which may directly drive a load or may be part of a first stage of any desired gear reduction for driving a load. The rotor 24, which is a permanent magnet with two series of poles or pole faces 50 of opposite polarities, may be entirely conventional. For the sake of clarity, the pole faces 50 are shown in FIG. 1 as sectioned peripheral parts of the rotor 24.

In operation of the motor, alternating current is supplied to the field coil 38 to excite the field, producing in the field plates 32 and 34 and their respective poles 40 and 42 opposite instantaneous polarities which change in phase with the alternating current, with the pole faces 50 of the rotor 24 cooperating with the field poles 40, 42 in driving the rotor in synchronism with the alternation of the current.

In accordance with the present invention, the motor is provided with a rotor start-assisting device 60 which functions, on reenergization of the field coil 38 after a rotor stop, to set the non-started rotor into axial vibration which overcomes any and all impediments, including motor load, to its self-start and brings about its unfailing and virtually instantaneous self-start. To this end, provision is made for axial movability of the rotor 24 with freedom to turn in any axial position, and there is provided a resilient means 62, preferably a spring, which normally urges the rotor 24 axially partly out of the field, i.e., out of substantial optimum register with the field poles 40, 42 (FIG. 2). The rotor 24 is axially movable in this instance by affording the rotor-carrying shaft 46 freedom of axial motion in its journal bearing 44. The spring 62, which in this instance is a helical compression spring surrounds the rotor shaft 46 and is interposed between the rotor 24 and shaft bearing 44, with the spring being in this instance not preloaded except by the weight of the idle rotor in the exemplary vertical motor position of FIG. 2.

In order to run the motor, the field coil 38 is supplied with current, with the result that the rotor 24 passes through its starting phase and takes off in either direction, with the rotor being on a wrong-directional start reversed into the correct drive direction by a usually provided directional drive control (not shown). In its starting phase, the rotor 24 will, on the very first or second and succeeding polarizations of the field poles 40 and 42, be set into and kept in axial vibration until taking off, with the rotor being for the first time axially drawn from its idle position (FIG. 2) into substantial optimum register with the field poles (FIG. 3) and then continuing to vibrate axially substantially between its position in FIG. 3 and a position intermediate those in FIGS. 2 and 3. Thus, when on re-energization of the field coil 38 after a rotor stop the respective initial polarities of the field poles 40 and 42 are for the first time such that their collective effect is axially to attract the pole faces 50 of the idle rotor 24 in whichever angular position the latter happens to be, the rotor will be drawn into the field (FIG. 3). The idle rotor will thus be drawn into the field for the first time with considerable force in any event, with the draw of the rotor into the field being particularly powerful if the current is at or near its periodic peak at the moment of its application to the field coil. Being thus drawn into the field for the first time (FIG. 3), the rotor will continue in axial vibration until taking off, with the spring 62 acting, on the one hand to yield to the rotor on its magnetic attractions into the field, and on the other hand to urge the rotor rebound-like from the field, i.e., from substantial optimum register with the field poles, sufficiently to permit the magnetic forces of the field and rotor poles, i.e., the polar magnetic forces, to exert themselves in repulsing the rotor from the field and thereby also controlling the frequency of the repulsions. The polar magnetic forces thus act in concert with the spring 62 in starting the rotor into, and keeping it in, axial vibration until it takes off, with the rotor vibrating at the frequency of the applied current and each rotor vibration in its to and fro directions being caused positively and with considerable force by magnetic attraction of the rotor into, and magnetic repulsion of the same from, the field, as will be readily understood. Once the rotor 24 takes off, the same has a predominant urge into substantial optimum axial register with the field poles 40, 42 (FIG. 3) which overpowers the urgency of the spring 62 to return it to its idle axial position (FIG. 2), with the rotor remaining in substantial optimum axial register with the field poles when running. This is due to the fact that not only will the permanently polarized pole faces 50 of the rotor 24 tend to keep the latter in the field, but the polar magnetic forces also exert themselves, not in any repulsions of the rotor from the field, but rather in drawing the rotor into the field (FIG. 3) with each half-cycle of the applied current, as the rotor poles are then predominantly in alignment with their opposite-polarity field poles at the proper moments.

It follows from the preceding that the spring 62 is preferably sufficiently weak to permit the polar magnetic forces to draw the rotor in its starting phase into, and keep the running rotor in, substantial optimum or full axial register with the field poles, yet is sufficiently strong to keep the idle rotor out of substantial optimum register with the field poles in any and all motor positions, including vertical position in which the spring is subjected to the full gravity of the rotor (FIG. 2).

It also follows from the preceding that axial starting vibration of the rotor 24 by the polar magnetic forces in concert with the spring 62 is entirely unimpeded by any forces resisting a rotor start and, hence, is irresistible, to the end of having the highly excited rotor respond to the polar magnetic forces with equally irresistible starting urgency. More particularly, axial starting vibration of the rotor in this fashion even acts in concert with the polar magnetic forces into compelling the rotor into additional vibration about its axis if needed for its take off, with the result that the polar magnetic forces then have on the extremely excited rotor a particularly powerful starting effect which will overcome even exceptional resistance to its start. Thus, with the exemplary rotor 24 having its pole faces 50 of identical peripheral width and being equal in number to the field poles 40 and 42, and assuming that the pole faces 50 of the rotor 24 in its idle position are angularly in substantial alignment with their nearest field poles (FIGS. 1 and 2), as they would be owing to the usual retentive last polarity of the field poles between motor stops, it may well be that the polar magnetic forces have on the initial axial rotor starting vibrations an angular displacement effect on the rotor which is inadequate to overcome whatever resistance the rotor may encounter for its start. However, the polar magnetic forces are sufficiently unbalanced, even at relatively closely held tolerances in the sizes and coordination of the field and rotor poles, to urge the axially vibrating rotor into sufficient angular creep to set it into additional vibration about its axis, with the rotor then being so highly excited that the polar magnetic forces will, suddenly or in inching fashion depending on the start resistance, but assuredly and with wedge-like urgency, force the rotor into a self-start. Hence, the present rotor start-assisting device is even suited for reliable starting of hitherto notoriously unreliable starters, such as the exemplary rotor 24 with its balanced poles for optimum running torque. Of course, unfailing and virtually instantaneous self-start of a rotor with the featured start-assisting device is even enhanced if the rotor is, for improved self-starting, designed, like most rotors, with some unbalance in its pole face arrangement, i.e., a pole face arrangement in which part of the pole faces are out of alignment with their nearest field poles when the remaining pole faces are in alignment with their nearest field poles.

The present rotor start-assisting device is also of exceeding structural simplicity and low cost, involving no more than the spring 62 and its negligible cost. Also, this device is in its rotor vibratory action and, hence, rotor starting, of the utmost effectiveness and reliability. Further, while the field poles of both sets in the exemplary motor of FIGS. 1 to 3 are arranged lengthwise parallel to the rotor axis and are also coextensive over the same length of the rotor axis, the present rotor start-assisting device will perform with all of its described important advantages in a motor with any other known field pole arrangement. Also, while the exemplary rotor 24 is shown with pole faces which are equal in number to the field poles and of identical peripheral width, and are even substantially continuous with each other, the present rotor start-assisting device will also perform with all of its advantages in a motor with any known permanent-magnet rotor, such as a rotor with spaced pole faces of the same or different widths, or a rotor with shaped pole faces, just to mention a few.

Many motors with the featured rotor start-assisting device have been put to lengthy tests under normal starting conditions as well as under exceptionally severe starting conditions under which motors without the start-assisting device failed all too often, with these tests, including life tests, showing absolute reliability of these featured devices in their rotor-start performance under any and all start-impeding conditions, including maximum motor loads limited only by the available running torque of the rotors.

While in the exemplary motor 20 of FIGS. 1 to 3 the field poles 40, 42 are lengthwise coextensive over the same length of the rotor axis and the rotor projects in its idle position axially beyond the field poles (FIG. 2), FIGS 4 and 5 show a modified motor 20a with field poles 40a 42a in which the rotor 24a is in its idle position (FIG. 4)

out of full register with all field poles, and is nevertheless in nearly full register, and may even be in full register, with a number of field poles, but is considerably out of register with the remaining field poles. To this end, the field poles 40a and 42a are arranged so that preferably a majority of the field poles are coextensive over an axial region r, while the remaining, fewer, field poles, and preferably field poles of the same set and, hence, of the same polarity when excited, are foreshortened, in this instance the field poles 42a', so as to leave within the axial region r an axial end zone z in which fewer than all field poles extend and in which the rotor extends in its idle position (FIG. 4). Thus, while in this field pole arrangement the rotor is in its idle position out of full register with all field poles, but is in nearly full register, and may be in full register, with a plurality of field poles (FIG. 4), the rotor, when running, is in substantial optimum register with all field poles (FIG. 5). With this or a similar field pole arrangement, there is achieved, on field reexcitation after a rotor stop, immediate and optimum exertion of the polar magnetic forces in setting the rotor into axial vibration as well as urging it into rotary motion.

While the rotor 24 in the described motor of FIGS. 1 to 3 is firmly mounted on its shaft 46 which is turnable and also axially movable in its bearing 44, the modified motor 20a just described also demonstrates the feasibility of firmly mounting the rotor shaft 46a in the center core 30a for its support, and having the rotor 24a loose on the fixed shaft 46a for its turnability and axial movability thereon, with the pinion 48a being mounted in the rotor 24a.

Reference is now had to FIGS. 6 to 11 which show a motor 20b with a modified rotor start-assisting device 60b which functions, in addition to setting the rotor into axial starting vibration, to also positively displace the rotor angularly from its idle position. The present rotor start-assisting device 60b is in this instance identical with the described device 60 of FIGS. 2 and 3 in structure and function insofar as axial starting vibration of the present rotor 24b is concerned. Thus, the spring 62b normally urges the rotor 24b into its idle position (FIGS. 7 and 8) in which the same is in partial register with the field poles 40b and 42b, and this spring 62b acts, in concert with the magnetic forces of the permanently polarized rotor pulse 50b and of the field poles 40b and 42b on reexcitation of the field after a rotor stop, to set the rotor 24b into axial starting vibration, with the rotor, when started, running in the axial position shown in FIGS. 9 and 11 in which the same is in substantial optimum register with the field poles. Axial starting vibration of the rotor is over an axial range one end of which is defined by the rotor position in FIGS. 9 and 11 and the other end of which is defined by the rotor position in FIG. 10, i.e., intermediate those in FIGS. 7 and 9, with the rotor being, on the first or succeeding polarization of the field poles on field reexcitation, drawn from its idle position in FIG. 7 into its vibratory range. Incidentally, the rotor 24b is shown to have unbalanced pole faces for improved self-starting, with the exemplary rotor having narrower pole faces 50b' and wider pole faces 50b'' among the remaining uniform-width pole faces 50b.

To the end of also angularly displacing the rotor 24b from its idle position on its axial starting vibration, the present rotor start-assisting device 60b provides for turnability, but no appreciable axial movability, of the rotor shaft 46b in its bearing in the center core 30b and its additional bearing 70 in this instance (FIG. 7), and further provides for free rotation and axial movability of the rotor 24b on its shaft 46b, with the shaft element 46b and rotor element 24b having a drive coupling in the form of cam and follower elements 72 and 74 which are carried by the rotor and shaft elements 24b and 46b and, in axial starting vibration of the rotor element 24b, cooperate in relatively angularly displacing the rotor and shaft elements. The cam element 72 is in the present instance either one of the flared side walls 76 and 78 of a slot 80 in a fixed insert 82 in the rotor 24b (FIGS. 6, 8, 10 and 11), while the cam follower 74 is in this instance a frusto-conical stud which projects into the groove 80 and extends with its periphery preferably parallel to the adjacent flared groove walls 76, 78 (FIGS. 10 and 11). Thus, in axial starting vibration of the rotor 24b, the cam element 76 or 78 on the vibrating rotor, and in this instance the cam element 76 in the example in FIGS. 10 and 11, cooperates with the follower element 74 on the axially stationary shaft 46b in slightly angularly displacing either the rotor element 24b or the shaft element 46b, whichever offers the least resistance. Thus, with the polar magnetic forces urging the axially vibrating rotor 24b counterclockwise in this example (FIG. 6), i.e., with its cam follower 74 into engagement with the cam element 76 in FIGS. 10 and 11, the shaft 46b may, on axial rotor vibration between the positions in FIGS. 10 and 11, be cammed by the cooperating elements 74 and 76 once or repeatedly in the same direction and start the motor load into motion through the pinion 48b which is fast on the shaft, in which case the rotor will most likely start immediately in counterclockwise direction (FIG. 6). However, if under the same circumstances the cooperating elements 74, 76 could not budge the rotor shaft 46b owing to the motor load or other resistance to its start, then the cooperating elements 74, 76 will cam the rotor into angular displacement once or repeatedly until it takes off in either direction, with either the cam element 76 or cam element 78 on the rotor taking the rotor shaft 46b and its load along at the follower element 74, as will be readily understood.

The follower stud 74 preferably has some lateral clearance in the groove 80 (FIGS. 10 and 11) to afford the rotor 24b or its shaft 46b some freedom to give way angularly, whichever encounters the least resistance, in order to permit the polar magnetic forces to set the rotor into initial axial vibration, and if need be also vibration about its axis, without impediment from any cam action from the elements 72 and 74 until the polar magnetic forces produce sufficient torque in the axially vibrating rotor to make the cam action of telling effect in the rotor start. Also, while the cam sides 76 and 78 of the groove 80 could be flared oppositely as shown in FIGS. 10 and 11 and the frusto-conical stud 74 reversed so as to be with its periphery parallel to these cam sides, it is preferred that these cam sides 76 and 78 be flared and the frusto-conical stud 74 disposed as shown, so that their coaction will not counteract the polar magnetic forces, but in fact assist them, in holding the rotor, when running, in substantial optimum register with the field poles (FIGS. 9 and 11).

The follower element 74 of the drive coupling between the rotor 24b and its shaft 46b is carried by the shaft 46b in this instance through intermediation of a member 86 which may be in the form of a torsion spring, having rigid end arms 88 and 90 suitably anchored to the shaft 46b and carrying the follower element 74, respectively (FIG. 6), and having therebetween a resiliently distortable, in this instance part-circular, length 92 of smaller width than the end arms 88 and 90, with the spring member 86 being preferably a leaf of uniform thickness with its plane normal to the rotor axis. The spring member 86 is designed and arranged safely to transmit the full running torque of the rotor for the drive of even a maximum motor load which the rotor is capable to drive, with the spring length 92 responding to the torque transmission in resilient torsion and thereby also acting to smoothen the load drive from the rotor. The spring member 86 is also axially yieldable and will thus not interfere with the polar magnetic forces in keeping the rotor, when running, in substantial optimum register with the field poles.

With the rotor start-assisting device 60b just described, there is thus achieved, at the most wedge-like jogging of the motor load, and at the least optimum enforced lively excitement of the rotor, with the rotor responding in either case to the polar magnetic forces with an unfailing self-start.

While in the several described, preferred, forms of the rotor start-assisting device the polar magnetic forces act in concert with the spring in setting the rotor into axial starting vibration into and from substantial optimum register with the field poles, FIG. 12 shows a motor 20c with another modified rotor start-assisting device 60c which functions to set the rotor into axial starting vibration while remaining in full register with the field poles, wherefore the polar magnetic forces do not participate in thus vibrating the rotor. To this end, the spring 62c urges the rotor 24c into the position shown, i.e., well within the axial confines of the field poles 40c and 42c, and the rotor carries at its lower face a ferromagnetic member 100 in the form of a disc which is within magnetic reach of the inner field plate 34c. The rotor 24c is in this instance fixed on its shaft 46c which is journalled and axially movable in a suitable bearing in the center core 30c and also carries the pinion 48c. Thus, on reenergization of the field coil 38c after a motor stop, the very first polarity of the field plate 34c will attract the ferromagnetic disc 100 and rotor 24c with its shaft, and subsequent polarities of this field plate will act in concert with the spring 62c in axially vibrating the disc and rotor with its shaft within the axial confines of the field poles until taking off in either direction. With the disc 100 being of ferromagnetic material, it stands to reason that the same is always attracted to, and never magnetically repulsed from, the field plate 34c, with the attractions occurring at twice the frequency of the applied current, as will be readily understood. Once the rotor starts, the same will no longer vibrate, for the continuing attractions of the ferromagnetic disc 100 to the field plate 34c will urge the rotor with its shaft to the thrust end of the aforementioned bearing (not shown) in the center core 30c.

The present invention also contemplates a rotor start-assisting device 60d (FIGS. 13 and 14) by means of which the rotor 24d responds to initial polarity changes of the field poles 40d and 42d in vibration other than axial, and more particularly in oscillation about a transverse axis xd thereof at right angles to its normal axis xd', with the polar magnetic forces acting in concert with spring means in oscillating the rotor into and from substantially optimum register with the field poles. To this end, the rotor 24d is in this instance provided with a square center hole 102 through which extends a square shank 104 of a plate 106 of preferably non-magnetic material on a shaft 108 which is turnable in a preferably lubricated, combined journal and thrust bearing 110 on the field plate 112. The plate 106 has on opposite sides of the rotor axis xd' fulcrums 114 on which the rotor is seated with V-shaped notches 116 in its underface 118. The square shank 104 of the plate 106 has a fairly accurate fit in the square hole 102 in the rotor 24d, except that there is some clearance c between them to permit limited oscillatory motion of the rotor on the fulcrums 114 about the rotor axis xd. The rotor 24d is thus drivingly connected with the plate 106 on the shaft 108 and has also freedom of limited oscillatory motion about its axis xd. Suitably secured to the plate shank 104 is a spring 120 of exemplary leaf type which normally urges the rotor 24d into the inclined position in FIG. 14 in which it is out of substantial optimum axial register with the field poles 40d, 42d. The square shank 104 of the plate 106 has in this instance an extension 122 on which a pinion 48d is mounted. The rotor 24d has in this instance shaped poles 124 and 126 of the exemplary opposite polarities indicated which in the exemplary idle rotor position of FIG. 13 are opposite inner and outer field poles 42d and 40d, respectively.

Assuming now that the field coil 38d is reenergized, the polar magnetic forces will act in concert with the spring 120 in setting the rotor 24d into lively oscillation into and from substantial optimum axial register with the field poles 40d and 42d until the rotor takes off in either direction, as will be readily understood by now. The plate 106 is preferably also provided with opposite shoulders 128 which serve as limit stops for the rotor if the latter should respond to a powerful initial current transient in a particularly lively oscillatory manner. Of course, once the rotor takes off, the same will by the polar magnetic forces be held in substantial optimum axial register with the field poles 40d, 42d.

While in all described forms of the featured rotor start-assisting device there is a spring which acts in concert with field magnetic forces in setting the rotor into axial starting vibration, it is also within the purview of the present invention to eliminate this spring and provide in lieu thereof a permanent magnet, such as, for example, eliminating the spring 62 in the motor of FIGS. 1 to 3 and providing a permanent magnet (not shown) to which is normally attracted the end of the rotor shaft 46 opposite its journalled end, and from which it is retracted by the polar magnetic forces on axial starting vibration of the rotor and during running of the same, as will be readily understood.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a synchronous reaction motor, the combination with a field including field poles arranged circularly about an axis, a coil acting when energized to excite said field, and a permanent-magnet rotor with poles of opposite polarities mounted for rotation about said axis, of a rotor start-assisting device comprising means providing for movability of said rotor in the direction of said axis with freedom to turn in any axial position, and means reacting, on coil reenergization after a rotor stop, with field magnetic forces to axially vibrate the non-started rotor within magnetic reach of said field poles.

2. In a synchronous reaction motor, the combination with a field including field poles arranged circularly about an axis, a coil acting when energized to excite said field, and a permanent-magnet rotor with poles of opposite polarities mounted for rotation about said axis, of a rotor start-assisting device comprising means providing for movability of said rotor in the direction of said axis with freedom to turn in any axial position, and means, including a resilient member urging said rotor into a certain axial position, reacting with field magnetic forces on coil reenergization after a rotor stop to axially vibrate the non-started rotor within magnetic reach of said field poles.

3. In a synchronous reaction motor, the combination with a field including field poles arranged circularly about an axis, a coil acting when energized to excite said field, and a permanent-magnet rotor with poles of opposite polarities mounted for rotation about said axis, of a rotor start-assisting device comprising means providing for movability of said rotor in the direction of said axis with freedom to turn in any axial position, and a resilient member urging said rotor into a certain axial position and, on coil reenergization after a rotor stop, reacting with the polar magnetic forces to axially vibrate the non-started rotor within magnetic reach of said field poles.

4. In a synchronous reaction motor, the combination with a field including field poles arranged circularly about an axis, a coil acting when energized to excite said field, a permanent-magnet rotor with poles of opposite polarities, a shaft on which said rotor is turnable and axially movable with freedom to turn in any axial position thereon, and bearing means supporting said shaft in coaxial extension with, and for rotation about, said axis, of a rotor start-assisting device comprising means reacting, on coil reenergization after a rotor stop, with field magnetic forces to axially vibrate the non-started rotor within magnetic reach of said field poles, and cam and follower elements on said shaft and rotor serving as a drive coupling between the latter and arranged to cooperate on axial rotor vibration in relatively angularly displacing said shaft and rotor.

5. In a synchronous reaction motor, the combination with a field, including a coil and two pole parts which are of opposite instantaneous polarities on coil energization and have formed field poles arranged circularly about an axis, and a permanent-magnet rotor with poles of opposite polarities mounted for rotation about said axis, of a rotor start-assisting device comprising means providing for movability of said rotor in the direction of said axis with freedom to turn in any axial position, resilient means urging said rotor into a certain axial position, and a magnetically responsive part on and movable with said rotor and being in said certain rotor position within axial magnetic attraction to one of said pole parts when polarized, with said resilient means yielding, on coil reenergization after a rotor stop, to said attractions of said rotor part with a force compelling the non-started rotor into axial vibration over a range within at least part of which its poles are in substantial optimum axial register with said field poles.

6. In a synchronous reaction motor, the combination with a field coil and two sets of field poles arranged circularly about an axis and being of opposite instantaneous polarities on energization of said coil, and a permanent-magnet rotor with poles of opposite polarities mounted for rotation about said axis, of a rotor start-assisting device comprising means providing for movability of said rotor in the direction of said axis with freedom to turn in any axial position, and resilient means urging said rotor axially out of substantial optimum register into partial register with the field poles, but yielding, on reenergization of said coil after a rotor stop, to attractions of the non-started rotor into substantial optimum register with the field poles by the polar magnetic forces.

7. The combination in a synchronous reaction motor as set forth in claim 6, in which said resilient means is a spring.

8. The combination in a synchronous reaction motor as set forth in claim 6, in which there is a bearing, and a shaft journalled and axially movable in said bearing with one end and carrying said rotor remote from said one end thereof, and said resilient means is a helical compression spring surrounding said shaft and interposed between said bearing and rotor.

9. The combination in a synchronous reaction motor as set forth in claim 6, in which there is a fixed shaft on which said rotor is turnable and axially movable.

10. The combination in a synchronous reaction motor as set forth in claim 6, in which the field poles extend lengthwise in the direction of said axis.

11. The combination in a synchronous reaction motor as set forth in claim 6, in which the field poles extend lengthwise in the direction of said axis and are coextensive over a length of said axis.

12. The combination in a synchronous reaction motor as set forth in claim 6, in which all field poles extend lengthwise in the direction of said axis, and a number of the field poles are coextensive over a length of said axis while the remaining field poles are coextensive with said number of field poles over only part of said axis length so as to leave within the field poles an axial region in which fewer than all field poles extend and in which the rotor extends when in said partial register with the field poles.

13. In a synchronous reaction motor, the combination with a field coil and two sets of field poles arranged circularly about an axis and being of opposite instantaneous polarities on energization of said coil, a permanent-magnet rotor member with poles of opposite polarities, a shaft member on which said rotor member is turnable and axially movable with freedom to turn in any axial position thereon, and bearing means supporting said shaft member in coaxial extension with, and for rotation about, said axis, of a rotor start-assisting device comprising spring means urging said rotor member axially out of substantial optimum register into partial register with the field poles but yielding, on reenergization of said coil after a rotor stop, to attraction of the non-started rotor member into substantial optimum register with the field poles by the polar magnetic forces with ensuing axial vibration of the non-started rotor member, and cam and follower elements on said members serving as a drive coupling between the latter and arranged to cooperate on axial vibration of said rotor member in relatively angularly displacing said members.

14. The combination in a synchronous reaction motor as set forth in claim 13, in which said device further comprises a substantially flat leaf spring connected at one end with one of said members and carrying one of said elements at its other end, with said leaf spring extending around said shaft member and lying substantially in a plane normal to said axis so as to act in resilient torsion on the drive of said shaft member by said rotor member.

15. The combination in a synchronous reaction motor as set forth in claim 14, in which said one spring end is connected with said shaft member, said one element is a stud of frusto-conical periphery with its axis extending normal to said plane, and the other element is carried by the rotor member and has a radial groove receiving said stud and having opposite side walls inclined in parallelism with the stud periphery.

16. The combination in a synchronous reaction motor as set forth in claim 15, in which said stud has lateral clearance in said groove widthwise thereof.

17. The combination in a synchronous reaction motor as set forth in claim 15, in which said stud and said inclined side walls are arranged to cooperate in forcing the rotor, when running, into substantial optimum register with the field poles.

18. In a synchronous reaction motor, the combination with a field including field poles arranged circularly about a first axis, a coil acting when energized to excite said field, and a permanent-magnet rotor with poles of opposite polarities mounted for rotation about said first axis in substantial optimum register with the field poles, of a rotor start-assisting device comprising means providing for movability of said rotor about a second axis normal to and intersecting said first axis, and a resilient member urging said rotor about said second axis out of substantial optimum register with the field poles and, on coil reenergization after a rotor stop, reacting with the polar magnetic forces to oscillate said rotor about said second axis within magnetic reach of said field poles.

References Cited
UNITED STATES PATENTS 2,153,775   4/1939   Poole            310—163
3,204,137   8/1965   Gardes et al.    310—164

MILTON O. HIRSHFIELD, *Primary Examiner.*

L. L. SMITH, *Assistant Examiner.*